(12) United States Patent
Saeki et al.

(10) Patent No.: US 7,436,148 B2
(45) Date of Patent: Oct. 14, 2008

(54) METHOD OF DETERMINING VOLTAGE CONDITION OF FUEL CELL VEHICLE

(75) Inventors: Hibiki Saeki, Utsunomiya (JP); Satoshi Aoyagi, Kawachi-gun (JP)

(73) Assignee: Honda Motor Co., Ltd.

( * ) Notice: Subject to any disclaimer, the term of this patent is extended or adjusted under 35 U.S.C. 154(b) by 181 days.

(21) Appl. No.: 11/143,380

(22) Filed: Jun. 1, 2005

(65) Prior Publication Data
US 2006/0012340 A1     Jan. 19, 2006

(30) Foreign Application Priority Data
Jun. 3, 2004   (JP) .......................... P 2004-165708

(51) Int. Cl.
*H02J 7/00*   (2006.01)
*H02P 1/54*   (2006.01)

(52) U.S. Cl. ........................... 320/104; 701/22; 318/108

(58) Field of Classification Search .................. 320/104, 320/101; 701/22; 318/108, 139; 429/9
See application file for complete search history.

(56) References Cited

U.S. PATENT DOCUMENTS 6,255,008 B1 * 7/2001 Iwase ............................ 429/9
6,580,977 B2 * 6/2003 Ding et al. ..................... 701/22
2003/0111977 A1 * 6/2003 Pearson ....................... 320/101

FOREIGN PATENT DOCUMENTS

JP    11-067253    3/1999
JP    2001-204106  7/2001

* cited by examiner

*Primary Examiner*—Gary L Laxton
*Assistant Examiner*—Yalkew Fantu
(74) *Attorney, Agent, or Firm*—Fish & Richardson P.C.

(57) ABSTRACT

A method of determining voltage conditions of a fuel cell vehicle which includes a motor as a driving force source of the vehicle, a motor control device for controlling operation of the motor, a fuel cell, to which a reaction gas is supplied, for generating electric power by an electrochemical reaction, and a battery device which is charged by the electric power generated by the fuel cell and sends and receives electrical energy to and from the motor by control of the motor control device. The method includes setting a voltage value, typically an average value, of an output voltage of the fuel cell within a range from a minimum value to a maximum value of an open circuit voltage of the battery device. Even when the fuel cell and the battery device are directly connected, overcharge or overdischarge can be prevented, thereby reducing frequency of voltage conversion.

11 Claims, 2 Drawing Sheets

US 7,436,148 B2

METHOD OF DETERMINING VOLTAGE CONDITION OF FUEL CELL VEHICLE

Priority is claimed on Japanese Patent Application No. 2004-165708, filed Jun. 3, 2004, the content of which is incorporated herein by reference.

BACKGROUND OF THE INVENTION

1. Field of the Invention

The present invention relates to a method of determining voltage conditions of fuel cell vehicles.

2. Description of Related Art

A typical example of known solid polymer membrane fuel cells has a cell in which a fuel electrode (i.e., an anode) and an air electrode (i.e., a cathode) are provided on either side of a solid polymer electrolyte membrane, and a plurality of such cells are stacked to form a stack. In this structure, hydrogen is supplied as a fuel to the fuel electrode, while air is supplied as an oxidizer to the air electrode, so that hydrogen ions, generated by catalytic reaction at the fuel electrode, pass the solid polymer electrolyte membrane and reach the air electrode, thereby producing an electrochemical reaction between the hydrogen ions and oxygen at the air electrode, and generating electric power.

In a typical example of known fuel cell vehicles in which a fuel cell as explained above is mounted as a driving (force) source, a battery device such as a capacitor or a battery is provided for storing electrical energy generated by the fuel cells and for sending or receiving electrical energy to and from a motor for running the vehicle.

In such fuel cell vehicles, the battery device is connected in parallel to the fuel cell via an output controller for controlling the current and the voltage output from the fuel cell. The output control operation, for example, electric power conversion of an output controller which includes a DC-DC converter or the like, may be controlled in accordance with the running state of the fuel cell vehicle, the operation state of the fuel cell, or the condition of the battery device (see, for example, Japanese Unexamined Patent Applications, First Publications Nos. H11-067253 and 2001-204106).

In the above-described fuel cell vehicles, electric power conversion, executed by an output controller having a DC-DC converter or the like, causes some amount of power loss. Therefore, it is required to reduce frequency of the operation of the output controller so as to prevent increase in the power loss.

SUMMARY OF THE INVENTION

In view of the above circumstances, an object of the present invention is to provide a method of determining voltage conditions of fuel cell vehicles, for (i) preventing increase in power loss accompanied with the electric power conversion and (ii) reducing the size of the battery device.

Therefore, the present invention provides a first method of determining voltage conditions of a fuel cell vehicle, wherein:

the fuel cell vehicle includes a motor as a driving force source of the vehicle, a motor control device (e.g., a power drive unit 15 in an embodiment explained later) for controlling operation of the motor, a fuel cell, to which a reaction gas is supplied, for generating electric power by an electrochemical reaction, and a battery device which is charged by the electric power generated by the fuel cell and sends and receives electrical energy to and from the motor by control of the motor control device; and the method includes setting a voltage value of an output voltage of the fuel cell (e.g., an average output voltage $VFC_{ave}$ and maximum and minimum output values of the fuel cell in the embodiment) within a range from a minimum value (e.g., a minimum open circuit voltage $OCV_{min}$ in the embodiment) to a maximum value (e.g., a maximum open circuit voltage $OCV_{max}$ in the embodiment) of an open circuit voltage of the battery device.

According to the above method, it is possible to prevent the output voltage of the fuel cell from falling outside the range from the minimum value to the maximum value of the open circuit voltage of the battery device. Therefore, even when the fuel cell and the battery device are directly connected to each other, overcharge or overdischarge can be prevented, thereby reducing or eliminating frequency of voltage conversion for increasing or decreasing the output voltage of the fuel cell or the terminal voltage of the battery device. Therefore, it is possible to prevent increase in electric power loss accompanied with the voltage conversion, and to efficiently drive the fuel cell vehicle.

In a typical example, the fuel cell vehicle further includes a voltage conversion device for increasing or decreasing a terminal voltage of the battery device and outputting the converted voltage; and the method includes setting an average of the output voltage (e.g., an average output voltage $VFC_{ave}$ in the embodiment) of the fuel cell within a range from the minimum value (e.g., the minimum open circuit voltage $OCV_{min}$ in the embodiment) to the maximum value (e.g., the maximum open circuit voltage $OCV_{max}$ in the embodiment) of the open circuit voltage of the battery device.

Accordingly, it is possible to prevent the average of the output voltage of the fuel cell, typically determined in accordance with the output characteristics of the fuel cell and the running state of the fuel cell vehicle, from falling outside the range from the minimum value to the maximum value of the open circuit voltage of the battery device. Accordingly, it is unnecessary to excessively increase the possible charging capacity of the battery device and the size of the battery device can be reduced. In addition, frequency of voltage conversion for increasing or decreasing the output voltage of the fuel cell or the terminal voltage of the battery device can be reduced, thereby preventing increase in electric power loss accompanied with the voltage conversion, and efficiently driving the fuel cell vehicle.

The present invention also provides a second method of determining voltage conditions of a fuel cell vehicle, wherein:

the fuel cell vehicle includes a motor as a driving force source of the vehicle, a motor control device (i.e., a power drive unit 15 in the embodiment) for controlling operation of the motor, a fuel cell, to which a reaction gas is supplied, for generating electric power by an electrochemical reaction, and a battery device which is charged by the electric power generated by the fuel cell and sends and receives electrical energy to and from the motor via the motor control device; and the method includes setting a maximum value of a terminal voltage (e.g., a maximum permitted terminal voltage $VB_{max}$ in the embodiment) of the battery device to be greater than a sum of an average of an open circuit voltage (e.g., an average open circuit voltage $OCV_{ave}$ in the embodiment) of the battery device and a terminal voltage (e.g., $IB_{max} \times R$ in the embodiment) of the battery device which corresponds to a maximum value of a charging current (e.g., a maximum charging current $IB_{max}$ in the embodiment) for charging the battery device.

Accordingly, when the battery device is charged by power generated by the fuel cell or regenerative power output by regenerative operation of the motor, frequency of voltage conversion for restricting the current value of the charging current can be reduced or eliminated, thereby preventing increase in electric power loss accompanied with the voltage conversion, and efficiently driving the fuel cell vehicle.

The first method may also include setting a maximum value of a terminal voltage of the battery device to be greater than a sum of an average of an open circuit voltage of the battery device and a terminal voltage of the battery device which corresponds to a maximum value of a charging current for charging the battery device.

In a typical example of the second method, the terminal voltage of the battery device which corresponds to the maximum value of the charging current is a product of the maximum value of the charging current and an internal resistance of the battery device.

In the first method, the output voltage of the fuel cell may be set in accordance with an output characteristic of the fuel cell and a predetermined running state of the fuel cell vehicle. In a typical example of this case, the predetermined running state is set to a running state which most frequently appears.

DETAILED DESCRIPTION OF THE INVENTION

Hereinafter, embodiments according to the present invention will be explained with reference to the drawings.

Figure 1:
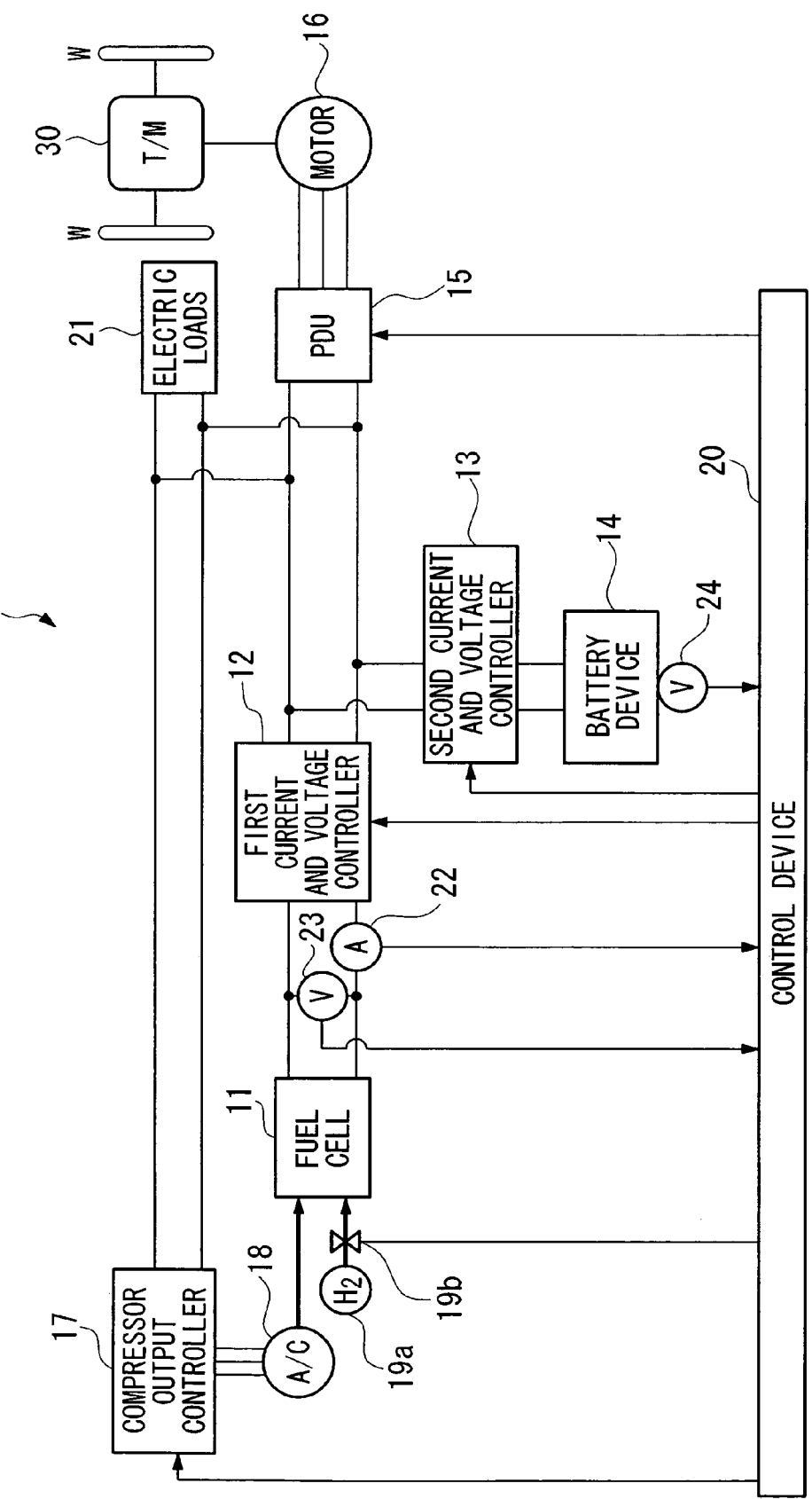
FIG. 1 is a diagram showing the structure of a fuel cell vehicle as an embodiment of the present invention.

FIG. 1 is a diagram showing the structure of a fuel cell vehicle as an embodiment of the present invention. As shown in FIG. 1, the fuel cell vehicle 1 has a fuel cell 11, a first current and voltage controller 12, a second current and voltage controller 13, a battery device 14, a power drive unit (PDU) 15, a motor 16, a compressor output controller 17, an air compressor (A/C) 18, a hydrogen tank 19a and a hydrogen supply valve 19b, a control device 20, electric loads 21, an output current sensor 22, an output voltage sensor 23, and a terminal voltage sensor 24.

In this fuel cell vehicle 1, driving force generated by the motor 16 is transmitted via a transmission (T/M) 30, which may be an automatic transmission (AT) or a manual transmission (MT), to driving wheels W of the vehicle 1. Conversely, when driving force is transmitted from the driving wheels W to the motor 12 during deceleration of the vehicle, the motor 12 functions as a generator for generating a regenerative braking force, so that the kinetic energy of the vehicle body is stored as electrical energy.

The fuel cell 11 has a cell unit including an electrolyte electrode structure in which a solid polymer electrolyte membrane, which may be a cation exchange membrane, is provided and supported between a fuel electrode (i.e., an anode) and an air electrode (i.e., a cathode), where the fuel electrode has an anode catalyst and a gas diffusion layer, and the air electrode has a cathode catalyst and a gas diffusion layer. This solid polymer electrolyte membrane is further supported by a pair of separators, that is, supported between the separators, so as to form the cell unit. A plurality of such cell units are stacked, thereby forming the fuel cell 11.

A fuel gas (i.e., a reaction gas), which is hydrogen, is supplied to the anode of the fuel cell 11 from the high-pressure hydrogen tank 19a via the hydrogen supply valve 19b. This hydrogen is ionized by catalytic reaction using the anode catalyst at the anode. The hydrogen ions then pass the solid polymer electrolyte membrane which is appropriately humidified, and reach the cathode. This ion transfer results in generation of electrons, which are supplied into an external circuit and used as DC (direct current) electrical energy. Air as an oxidizer gas (i.e., a reaction gas) which includes oxygen is supplied by the air compressor (A/C) 18 to the cathode, so that hydrogen ions, electrons, and oxygen react with each other, thereby generating water.

The generated electric current (i.e., output current) extracted from the fuel cell 11 is input into the first current and voltage controller 12, to which the battery device 14 is connected via the second current and voltage controller 13. The battery device 14 may be a capacitor in which a plurality of capacitor cells, which may be electric double layer capacitors or electrolytic capacitors, are connected in series.

A pair of the fuel cell 11 and the first current and voltage controller 12, and a pair of the second current and voltage controller 13 and the battery device 14, are connected in parallel to (i) the motor 16 for running the vehicle, via the power drive unit (PDU) 15, (ii) the electric loads which include various accessories (or auxiliary devices) such as a cooling device (not shown) for cooling the fuel cell 11 or the battery device 14, or an air conditioning device (not shown), and (iii) the compressor output controller 17.

Each of the first and second current and voltage controllers 12 and 13 typically has a chopper DC-DC converter. According to the chopping operation of the DC-DC converter, more specifically, ON/OFF operation of switching devices included in the DC-DC converter, the current value of the output current supplied from the fuel cell 11, and the current values of the charging and discharging currents of the battery device 14 are controlled. The above chopping operation is controlled in accordance with the duty ratio of the control pulse input from the control device 20, that is, the ratio between ON and OFF states of the control pulse.

When provision of output current from the fuel cell 11 is prohibited, if the duty ratio of the control pulse input from the control device 20 to the first and second current and voltage controllers 12 and 13 is set to 0%, the switching devices included in the DC-DC converters of the current and voltage controllers 12 and 13 are set and fixed to an off state, thereby electrically disconnecting the fuel cell 11 and the battery device 14 from each other. Conversely, if the duty ratio of the control pulse is set to 100% and every switching device is set to an on state, the fuel cell 11 and the battery device 14 are substantially directly connected to each other, so that the output voltage of the fuel cell 11 and the terminal voltage of the battery device 14 have the same voltage value.

Additionally, if the duty ratio of the control pulse input into the first current and voltage controller 12 is set to any appropriate value from 0% to 100%, the first current and voltage controller 12 appropriately restricts the output current of the fuel cell 11 (i.e., the primary current) in accordance with the duty ratio of the control pulse, and outputs current, obtained under the restriction, as a secondary current.

If the duty ratio of the control pulse input into the second current and voltage controller 13 is set to any appropriate value from 0% to 100%, the second current and voltage controller 13 appropriately restricts the discharging or charging current of the battery device 14 in accordance with the duty ratio of the control pulse.

The PDU 15 has a PWM inverter which employs pulse width modulation (PWM). The PWM inverter includes a bridge circuit in which transistors are connected as switching devices in a bridge form. In accordance with a control command output from the control device 20, the PDU 15 controls the driving and regenerating operations of the motor 16. When the motor 16 is driven, the PDU converts the DC current, which is supplied from the first and second current and voltage controllers 12 and 13, into three-phase AC current (i.e., alternating current), in accordance with a torque command input from the control device 20. The three-phase AC current is supplied to the motor 16. When regeneration of the motor 16 is performed, the PDU 15 converts three-phase AC current, which is output from the motor 16, into DC current, and then supplies the DC current via the second current and voltage controller 13 to the battery device 14, thereby charging the battery device 14.

The electric power conversion by the PDU 15 is controlled by pulses input from the control device 20 to each switching device of the PWM inverter, that is, by pulses for ON/OFF driving each switching device in the pulse width modulation (PWM). The duty ratio of the pulse, that is, a map (or data) for a ratio between ON and OFF states thereof, is stored in advance in the control device 20.

The motor 16 may be a three-phase AC synchronous motor using a permanent magnet for generating a magnetic field. Accordingly, driving of the motor 16 is controlled by three-phase AC power supplied from the PDU 15. When driving force is transmitted from the driving wheels W to the motor 16 during deceleration of the fuel cell vehicle 1, the motor 16 functions as a generator for generating a regenerative braking force, so that the kinetic energy of the vehicle body is stored as electrical energy.

The air compressor 18 typically compresses air drawn from the outside of the vehicle, and supplies the compressed air as a reaction gas to the cathode of the fuel cell 11. Based on a control command input from the control device 20, the rotation speed of a motor (not shown) for driving the air compressor 18 is controlled by the compressor output controller 17 which typically has a PWM inverter operating by PWM (pulse width modulation).

In order to control the electric generation state of the fuel cell 11, the control device 20 outputs a command value related to the rate of flow of the reaction gas supplied from the air compressor 18 to the fuel cell 11, and a command value related to the degree of opening of the hydrogen supply valve 19b, based on, for example, (i) the driving state of the fuel cell vehicle 1, (ii) the concentration of hydrogen included in the reaction gas supplied to the anode of the fuel cell 11, (iii) the concentration of hydrogen included in the exhaust gas discharged from the anode of the fuel cell 11, and (iv) the electric generation state of the fuel cell 11 such as the terminal voltage of each of the cell units of the fuel cell 11 and output current provided from the fuel cell 11.

Additionally, according to a command for performing generation of the fuel cell 11, the control device 20 outputs control pulses for controlling the electric power conversion of the first current and voltage controller 12, so as to control the current value of output current provided from the fuel cell 11.

The control device 20 also controls the electric power conversion of the PWM inverter provided in the PDU 15. For example, when the motor 16 is driven, the control device 20 outputs a torque command, based on a signal which indicates the degree of depression of an accelerator pedal depressed by the driver of the vehicle. When the control device 20 inputs the torque command into the PDU 15, a PWM signal corresponding to the torque command is input into the PWM inverter, so that each phase current for generating required torque is output to the corresponding phase of the motor 16.

In addition, the control device 20 controls the regenerative operation of the motor 16 based on the state of the battery device 14 which may have a capacitor, where the state may be the temperature of the battery device 14, or a measured value of the terminal voltage of the battery device 14, which is the total sum of voltages of capacitor cells which form the capacitor.

Furthermore, based on the state of the battery device 14, the control device 20 outputs control pulses for controlling the electric power conversion of the second current and voltage controller 13, thereby controlling the charging current and the discharging current of the battery device 14.

Therefore, the control device 20 receives various measurement signals from (i) a fuel cell unit voltage sensor (not shown) for measuring the terminal voltage of each of the cell units which form the fuel cell 11 (i.e., the fuel cell unit voltage), (ii) the output current sensor 22 for measuring the current value of the output current provided from the fuel cell 11, (iii) the output voltage sensor 23 for measuring the output voltage of the fuel cell 11, (iv) the terminal voltage sensor 24 for measuring the terminal voltage of the battery device 14, and (v) a temperature sensor (not shown) for measuring the temperature of the battery device 14.

Below, the method of determining the voltage condition of the fuel cell vehicle 1 having the above-explained structure will be explained.

Figure 2:
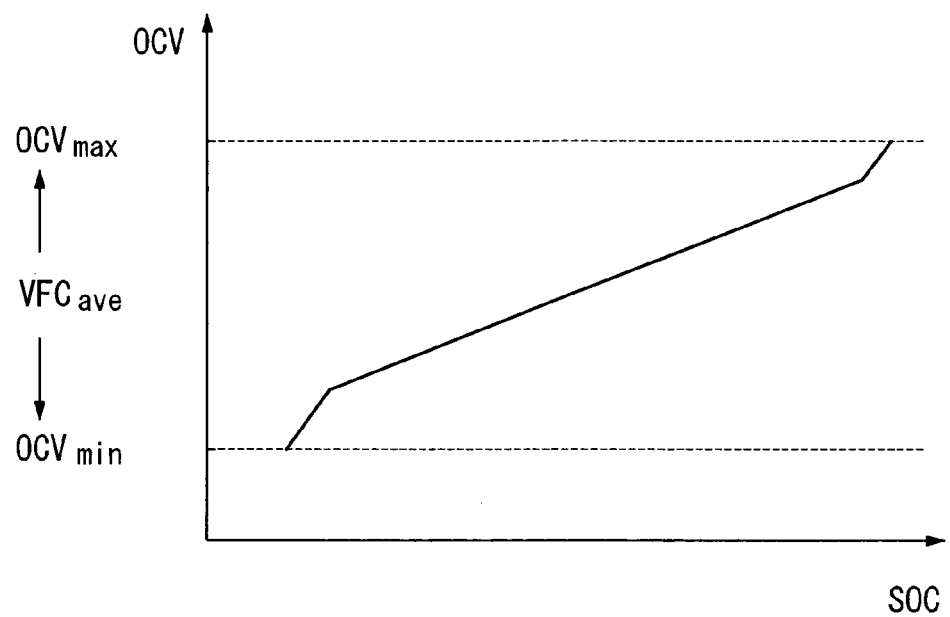
FIG. 2 is a graph showing an example of the relationship between the remaining charge quantity SOC and the open circuit voltage OCV of the battery device.

FIG. 2 is a graph showing an example of the relationship between the remaining (charge) quantity (i.e., SOC (state of charge)) and the open circuit voltage (OCV) of the battery device. In the following explanation and FIG. 2, voltage characteristics of the battery device 14 are referred to, which include (i) the open circuit voltage OCV, which is the terminal voltage with no load, (ii) the maximum (open circuit) voltage $OCV_{max}$, which is the open circuit voltage when the battery device 14 is fully charged, that is, when the remaining quantity of the battery device 14 is at a predetermined upper limit, and (iii) the minimum (open circuit) voltage $OCV_{min}$, which is the open circuit voltage when the battery device 14 is uncharged, that is, when the remaining quantity of the battery device 14 is at a predetermined lower limit. In the method of determining the voltage condition of the fuel cell vehicle 1, first, the voltage characteristics of the battery device 14 are determined in a manner such that the average output voltage $VFC_{ave}$ of the fuel cell 11 is included within a range between the the maximum voltage $OCV_{max}$ and the minimum voltage $OCV_{min}$ (see FIG. 2 and formula (1)).

$$OCV_{max} > VFC_{ave} > OCV_{min} \quad \ldots(1)$$

In the above formula (1), the average output voltage $VFC_{ave}$ is an average of the output voltage of the fuel cell 11 which is determined in accordance with the output characteristics of the fuel cell 11 and a predetermined running state of the fuel cell vehicle 1. The predetermined running state may be a running state which most frequently appears.

That is, the number of stacked cells (e.g., capacitor cells), which are connected in series so as to form the battery device 14, is determined so as to satisfy formula (1) related to the average output voltage $VFC_{ave}$ according to the predetermined running state.

As another voltage characteristic of the battery device 14, a maximum permitted terminal voltage $VB_{max}$ is defined, which is a permitted maximum value of the total sum of the terminal voltages of the serially-connected cells (e.g., capacitor cells). The maximum permitted terminal voltage $VB_{max}$ is set to be greater than the terminal voltage of the battery device 14 when fully charged (see formula (2)).

$$VB_{max} > OCV_{ave} + IB_{max} \times R \qquad ...(2)$$

In the above formula (2), the terminal voltage of the full-charged battery device 14 is defined as the sum of (i) the average open circuit voltage $OCV_{ave}$ of the battery device 14 and (ii) the product of the maximum charging current $IB_{max}$ and the internal resistance of the battery device 14. Here, the average open circuit voltage $OCV_{ave}$ is the open circuit voltage corresponding to the average remaining quantity of the battery device 14, typically determined in accordance with the output characteristics of the fuel cell 11 and a predetermined running state of the fuel cell vehicle 1 when the fuel cell 11 and the battery device 14 are directly connected. The predetermined running state may be a running state which most frequently appears.

That is, the number of stacked cells (e.g., capacitor cells), which are connected in series so as to form the battery device 14, is determined so as to satisfy formula (2) related to the average open circuit voltage $OCV_{ave}$ determined according to the predetermined running state. Accordingly, the number of stacked cells, which determines the terminal voltage of the battery device 14, is determined so as to satisfy both formulas (1) and (2).

As another voltage characteristic of the battery device 14, a minimum permitted terminal voltage $VB_{min}$ is defined, which is a permitted minimum value of the total sum of the terminal voltages of the serially connected cells (e.g., capacitor cells). Based on the minimum permitted terminal voltage $VB_{min}$ and the open circuit voltage OCV of the battery device 14, the following formula (3) is defined.

$$PFC_{min} + (OCV - VB_{min}) \times VB_{min}/R = P_{max} \qquad ...(3)$$

In the above formula (3), the first term at the left side is an output $PFC_{min}$ of the fuel cell 11 when the fuel cell 11 and the battery device 14 are directly connected and the terminal voltage of the battery device 14 is at the minimum permitted terminal voltage $VB_{min}$, and the second term from the left side is the output of the battery device 14 when the terminal voltage of the battery device 14 is at the minimum permitted terminal voltage $VB_{min}$. That is, in the present setting method, the sum of the first and second terms (i.e., the sum of the outputs of the fuel cell 11 and the battery device 14, described based on $VB_{min}$ and OCV) is made to be equal to the maximum output $P_{max}$ of the electric power supply system which consists of the fuel cell 12 and the battery device 14.

Figure 3:
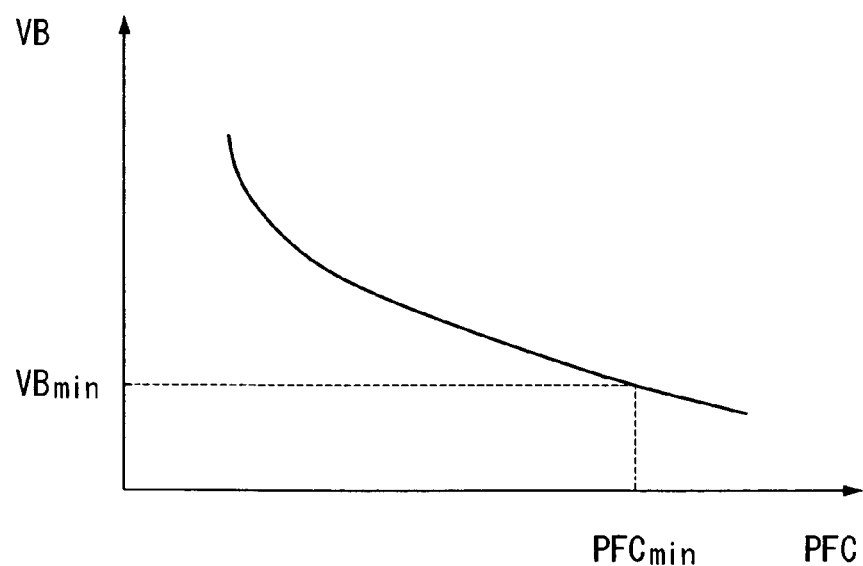
FIG. 3 is a graph showing an example of the relationship between the output PFC of the fuel cell and the terminal voltage VB of the battery device.

FIG. 3 is a graph showing an example of the relationship between the output PFC of the fuel cell 11 and the terminal voltage VB of the battery device 14. As shown in FIG. 3, when the fuel cell 11 and the battery device 14 are directly connected, the output PFC of the fuel cell 11 and the terminal voltage VB of the battery device 14 have an appropriate correlation according to the output characteristics of the fuel cell 11 and the like. Therefore, in the above formula (3), the output $PFC_{min}$ of the fuel cell 11 may be described as a function of the minimum permitted terminal voltage $VB_{min}$.

In the electric power supply system having the fuel cell 11 and the battery device 14, if the minimum permitted terminal voltage $VB_{min}$ is unknown, $VB_{min}$ can be computed using formula (3), and the computed minimum permitted terminal voltage $VB_{min}$ is the minimum value of the terminal voltage of the battery device 14 necessary for generating the predetermined maximum output $P_{max}$ when the fuel cell 11 and the battery device 14 are directly connected.

In addition, if the open circuit voltage OCV and the remaining quantity SOC of the battery device 14 are known, OCV can be computed using formula (3), and the computed open circuit voltage OCV is a value necessary for making the terminal voltage of the battery device 14 be equal to or higher than the predetermined minimum permitted terminal voltage $VB_{min}$ when the specific maximum output $P_{max}$ is produced while the fuel cell 11 and the battery device 14 are directly connected.

Additionally, the remaining quantity SOC corresponding to the open circuit voltage OCV necessary for making the terminal voltage of the battery device 14 be equal to or higher than the predetermined minimum permitted terminal voltage $VB_{min}$ can be computed by referring to, for example, a map (not shown) which shows relationships between the open circuit voltage OCV and the remaining quantity SOC and which is prepared according to the voltage characteristics of the battery device 14 on which no load is imposed and which has no degradation (i.e., in an initial state or the like).

As explained above, according to the method of determining the voltage condition of the fuel cell vehicle in the present embodiment, it is possible to prevent the average output voltage $VFC_{ave}$ of the fuel cell 11, typically determined in accordance with the output characteristics of the fuel cell 11 and the running state of the fuel cell vehicle 1, from falling outside the range from the minimum open circuit voltage $OCV_{min}$ to the maximum open circuit voltage $OCV_{max}$ of the battery device 14. Accordingly, it is unnecessary to excessively increase the possible charging capacity of the battery device 14 and the size of the battery device 14 can be reduced. In addition, frequency of voltage conversion for increasing or decreasing the output voltage of the fuel cell 11 or the terminal voltage of the battery device 14 can be reduced, thereby preventing increase in electric power loss accompanied with the voltage conversion, and efficiently driving the fuel cell vehicle 1.

In addition, when the battery device 14 is charged by power generated by the fuel cell 11 or regenerative power output by regenerative operation of the motor 16, frequency of voltage conversion for restricting the current value of the charging current can be reduced or eliminated, thereby preventing increase in electric power loss accompanied with the voltage conversion, and efficiently driving the fuel cell vehicle 1.

In the above-explained embodiment, the fuel cell vehicle 1 has the first current and voltage controller 12 and the second current and voltage controller 13; however, one of the first and second current and voltage controllers 12 and 13 may be left out.

Also in the above embodiment, the average output voltage $VFC_{ave}$ of the fuel cell 11 is set within the range from the minimum open circuit voltage $OCV_{min}$ to the maximum open circuit voltage $OCV_{max}$. However, this is not a limiting condition. In another example of settings, a predetermined maximum output voltage and a predetermined minimum output voltage of the fuel cell 11 are set within the range from the minimum open circuit voltage $OCV_{min}$ to the maximum open circuit voltage $OCV_{max}$.

Accordingly, the frequency of voltage conversion for increasing or decreasing the output voltage of the fuel cell 11 or the terminal voltage of the battery device 14 can be reduced or eliminated, thereby preventing increase in electric power loss accompanied with the voltage conversion, and efficiently driving the fuel cell vehicle 1.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method of determining voltage conditions of a fuel cell vehicle, wherein:

the fuel cell vehicle includes:
a motor as a driving force source of the vehicle, a motor control device for controlling operation of the motor, a fuel cell, to which a reaction gas is supplied, for generating electric power by an electrochemical reaction, and a battery device which is charged by the electric power generated by the fuel cell and sends and receives electrical energy to and from the motor by control of the motor control device;
a voltage conversion device, which comprises a chopper DC-DC converter, for increasing or decreasing a terminal voltage of the battery device and outputting the converted voltage, wherein the battery device and the DC-DC converter are connected to the fuel cell in parallel; and
a control device for outputting a control pulse to the DC-DC converter, wherein the fuel cell and the battery device are directly connected to each other via the DC-DC converter when the duty ratio of the control pulse is set to 100%; and
the method includes setting an average of an output voltage of the fuel cell within a range from a minimum value to a maximum value of an open circuit voltage of the battery device.

2. A method of determining voltage conditions of a fuel cell vehicle, wherein:

the fuel cell vehicle includes:
a motor as a driving force source of the vehicle, a motor control device for controlling operation of the motor, a fuel cell, to which a reaction gas is supplied, for generating electric power by an electrochemical reaction, and a battery device which is charged by the electric power generated by the fuel cell and sends and receives electrical energy to and from the motor via the motor control device;
a voltage conversion device, which comprises a chopper DC-DC converter, for increasing or decreasing a terminal voltage of the battery device and outputting the converted voltage, wherein the battery device and the DC-DC converter are connected to the fuel cell in parallel; and
a control device for outputting a control pulse to the DC-DC converter, wherein the fuel cell and the battery device are directly connected to each other via the DC-DC converter when the duty ratio of the control pulse is set to 100%; and
the method includes setting a maximum value of a terminal voltage of the battery device to be greater than a sum of an average of an open circuit voltage of the battery device and a terminal voltage of the battery device which corresponds to a maximum value of a charging current for charging the battery device.

3. A method of determining voltage conditions of a fuel cell vehicle, wherein:

the fuel cell vehicle includes:
a motor as a driving force source of the vehicle, a motor control device for controlling operation of the motor, a fuel cell, to which a reaction gas is supplied, for generating electric power by an electrochemical reaction, and a battery device which is charged by the electric power generated by the fuel cell and sends and receives electrical energy to and from the motor by control of the motor control device;
a voltage conversion device, which comprises a chopper DC-DC converter, for increasing or decreasing a terminal voltage of the battery device and outputting the converted voltage, wherein the battery device and the DC-DC converter are connected to the fuel cell in parallel; and
a control device for outputting a control pulse to the DC-DC converter, wherein the fuel cell and the battery device are directly connected to each other via the DC-DC converter when the duty ratio of the control pulse is set to 100%; and
the method includes:
setting a voltage value of an output voltage of the fuel cell within a range from a minimum value to a maximum value of an open circuit voltage of the battery device, and
setting a maximum value of a terminal voltage of the battery device to be greater than a sum of an average of an open circuit voltage of the battery device and a terminal voltage of the battery device which corresponds to a maximum value of a charging current for charging the battery device.

4. The method as claimed in claim 1, wherein the method includes setting a maximum value of a terminal voltage of the battery device to be greater than a sum of an average of an open circuit voltage of the battery device and a terminal voltage of the battery device which corresponds to a maximum value of a charging current for charging the battery device.

5. The method as claimed in claim 2, wherein the terminal voltage of the battery device which corresponds to the maximum value of the charging current is a product of the maximum value of the charging current and an internal resistance of the battery device.

6. The method as claimed in claim 3, wherein the terminal voltage of the battery device which corresponds to the maximum value of the charging current is a product of the maximum value of the charging current and an internal resistance of the battery device.

7. The method as claimed in claim 1, wherein the output voltage of the fuel cell is set in accordance with an output characteristic of the fuel cell and a predetermined running state of the fuel cell vehicle.

8. The method as claimed in claim 7, wherein the predetermined running state is set to a running state which most frequently appears.

9. The method as claimed in claim 1, wherein a minimum permitted terminal voltage of the battery device is defined as a minimum value of the terminal voltage of the battery device necessary for generating a predetermined maximum output of an electric power supply system consisting of the fuel cell and the battery device when the fuel cell and the battery devices are substantially directly connected to each other.

10. The method as claimed in claim 9, wherein the minimum permitted terminal voltage is a permitted minimum value of the total sum of terminal voltages of serially-connected cells in the battery device.

11. A fuel cell vehicle comprising:
a fuel cell;
a motor driven by electric power which is generated by the fuel cell;
a battery device connected to the fuel cell in parallel, wherein the battery device is charged by the electric power generated by the fuel cell, and supplies electric power to the motor; and a DC-DC converter for controlling the electric power supplied by the battery device, in accordance with an ON/OFF operation of a switching device, wherein:

when an output voltage of the fuel cell is set within a range from a minimum value to a maximum value of an open circuit voltage of the battery device, the switching device is set to an on state so as to directly connect the fuel cell and the battery device to each other.

* * * * *